(12) United States Patent
Lichtinger et al.

(10) Patent No.: US 6,502,048 B1
(45) Date of Patent: Dec. 31, 2002

(54) CALIBRATION FOR A VEHICLE WEIGHT CLASSIFICATION SYSTEM

(75) Inventors: Harald Lichtinger, Auburn Hills, MI (US); Ralf Oestreicher, Kandel (DE); Kenneth Francis, Alteglofsheim (DE)

(73) Assignee: Seimens VDO Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/652,599

(22) Filed: Aug. 31, 2000

Related U.S. Application Data
(60) Provisional application No. 60/152,424, filed on Sep. 3, 1999.

(51) Int. Cl.[7] ............................................. G01G 19/00
(52) U.S. Cl. ..................... 702/101; 702/175; 702/305; 177/25.11
(58) Field of Search ................... 702/101, 104, 702/175, 305; 701/45; 73/1.88, 1.37; 280/35; 177/25.11

(56) References Cited

U.S. PATENT DOCUMENTS

| | | |
|---|---|---|
| 5,474,327 A | 12/1995 | Schousek |
| 5,832,417 A | 11/1998 | Petrucelli et al. |
| 6,029,496 A * | 2/2000 | Kreft .......................... 73/1.37 |
| 6,070,115 A * | 5/2000 | Oestreicher et al. .......... 701/45 |
| 6,237,394 B1 * | 5/2001 | Harris et al. ................. 73/1.88 |

OTHER PUBLICATIONS

International Search Report for PCT/US00/23683 Aug. 29, 2000.

* cited by examiner

*Primary Examiner*—John S. Hilten
*Assistant Examiner*—Tung Lau

(57) ABSTRACT

A vehicle seat weight classification system includes a recalibration strategy to ensure sensor accuracy over time. A controller preferably is programmed to periodically sample outputs of the sensors when a seat is unoccupied. Average sensor output information is compared to a currently stored calibration value. If the newly determined average value meets selected criteria, then the sensor is recalibrated using the new information. The system and method of this invention compensates for changes in sensor performance over time caused by changes in system characteristics, such as material offset drift.

12 Claims, 2 Drawing Sheets

CALIBRATION FOR A VEHICLE WEIGHT CLASSIFICATION SYSTEM

RELATED APPLICATIONS

This application claims priority to U.S. provisional application Ser. No. 60/152,424, which was filed on Sep. 3, 1999.

BACKGROUND OF THE INVENTION

This invention generally relates to weight classification systems for vehicles. More particularly, this invention relates to a calibration method for calibrating sensors used in a vehicle seat weight classification system.

Vehicle safety restraint systems have changed over the years. Seat belts have proven effective at minimizing injuries during accidents. Additional safety devices have been introduced such as air bags. While air bags provide additional benefits, it has become apparent that individualized air bag control would be beneficial. More recently, systems for classifying the weight of a seat occupant have been developed that allow for individualized control of an air bag.

One example weight classification system includes a plurality of sensors within a seat base portion of the seat. The sensors provide electrical signals indicative of the seat occupant's weight. These signals are processed and utilized to determine an air bag deployment strategy according to selected guidelines.

One issue presented by such weight classification systems is the possibility for the sensors to become less accurate over time. One issue that must be accommodated is the possibility for material offset drift, which may have an effect on the accuracy of the weight determination. Because the characteristics of a vehicle seat change over time, the performance of the sensors associated with that seat may also change. Therefore, there is a need to recalibrate or accommodate changes in the system over time.

This invention addresses the need for automatically recalibrating a weight classification system to compensate for changes in system performance such as material offset drift.

SUMMARY OF THE INVENTION

In general terms, this invention is a system and method for recalibrating a vehicle seat weight classification system. A system designed according to this invention includes a plurality of sensors in the vehicle seat that provide signals indicating the weight of a load on the seat. A controller communicates with the sensors. The controller also determines when a calibration condition exists. The controller samples outputs of each of the sensors, preferably when there is no load on the seat. The sample sensor outputs preferably are taken intermittently over a selected period of time. The controller determines an average value of the sensors outputs. The average value is then compared to a current calibration value and, if selected conditions are met, the new average value is substituted for the calibrated value. Accordingly, each sensor of the weight classification system can be individually recalibrated to compensate for changes in the system over time.

A method of this invention includes several basic steps. The method preferably begins by determining when a calibration condition exists. If the calibration condition exists, a plurality of outputs of the system sensors are sampled over a selected period. An average output of each sensor is determined using the sampled outputs. If the average is within a selected range then the corresponding sensor is recalibrated using the average value.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
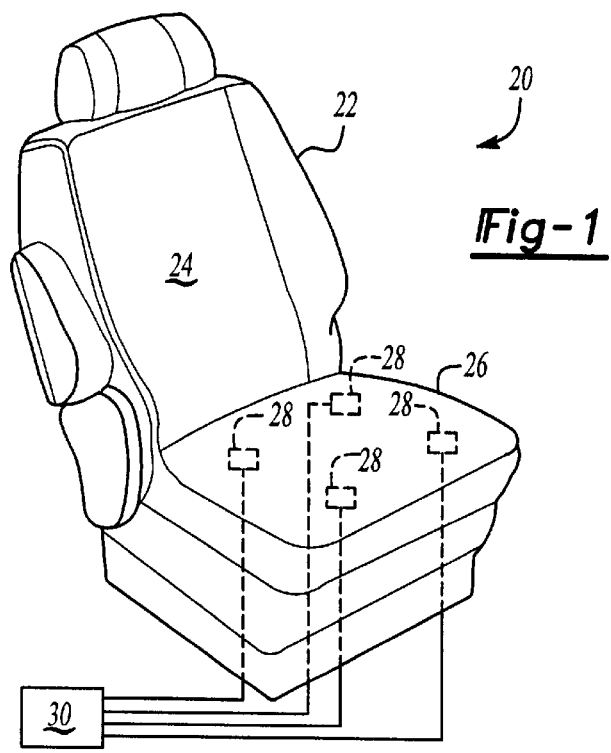
FIG. 1 diagrammatically illustrates the system designed according to this invention.

A vehicle seat weight classification system 20 is schematically shown in FIG. 1. A seat 22 includes a seat back 24 and seat base 26. A plurality of sensors 28 preferably are provided in the seat base 26. The sensors 28 preferably are strain gauge sensors that each provide electrical output signals indicative of a deflection in the material of the seat base 26. The sensors 28, therefore, provide signals indicative of the weight of a load on the seat base 26.

Further details regarding the preferred operation of the sensors and the weight determination using the system 20 can be found, for example, in U.S. patent application Ser. No. 09/191,719, filed on Nov. 12, 1998, which is commonly owned with this application. The teachings of that document are incorporated into this specification by reference.

A controller 30 communicates with the sensors 28. The controller 30 receives output signals from the sensors 28 and preferably controls the supply of power to the sensors. The controller 30 preferably monitors the output of each sensor to determine the presence of a load on the seat 22. The controller 30 preferably also manages recalibration of the sensors 28 according to this invention.

Figure 2:
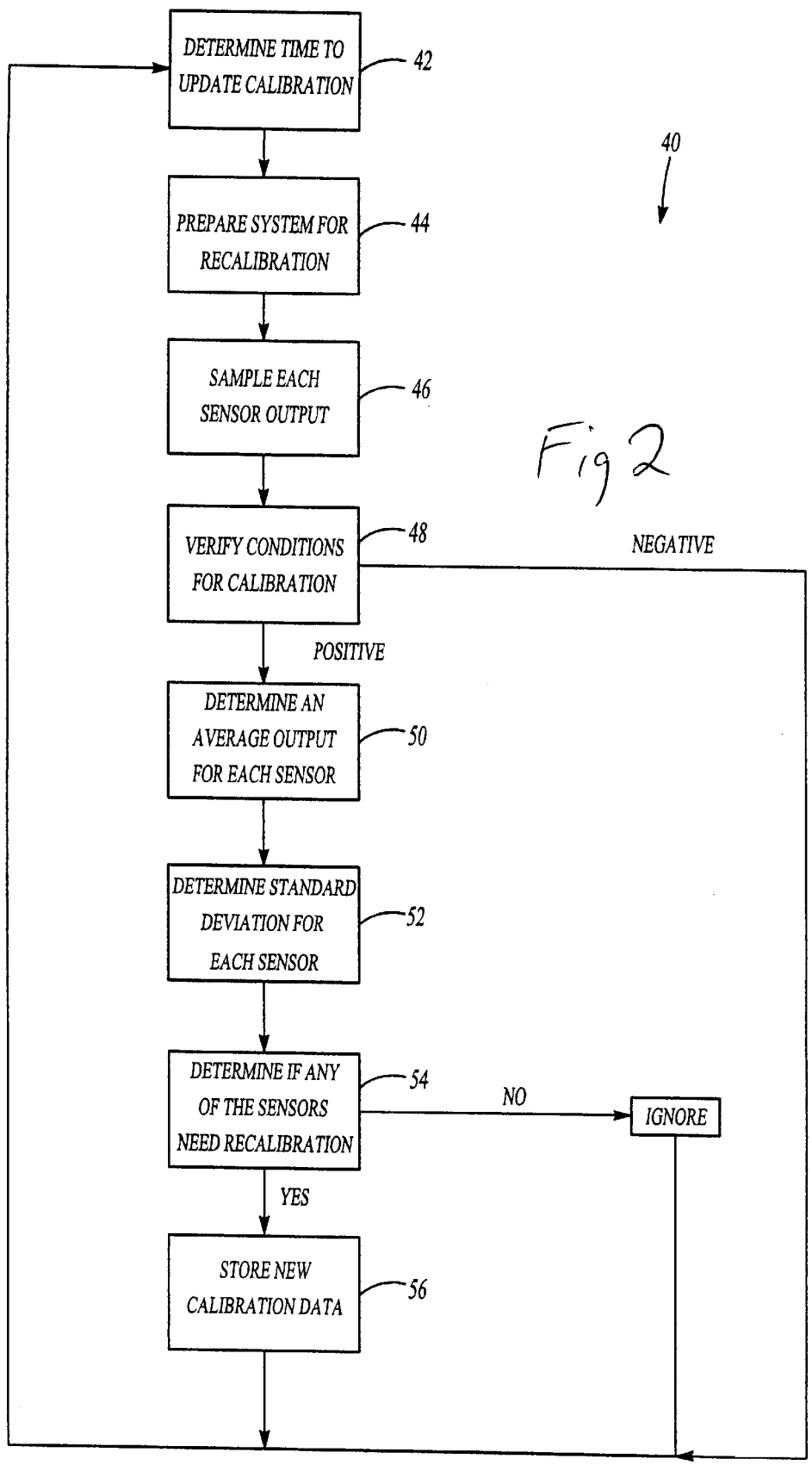
FIG. 2 is a flow chart diagram illustrating a method of this invention.

FIG. 2 includes a flow chart diagram 40 that illustrates the general flow of the inventive method of calibrating the weight classification system 20. A first step 42 includes determining when it is time to update the calibration of the sensors 28. This preferably includes utilizing an event that occurs repeatedly and monitoring the number of times that event occurs to trigger a recalibration operation. In one example, the controller 30 monitors the number of times the vehicle ignition is turned on and off. By counting the number of on/off cycles of the ignition, the controller 30 is able to determine when it is time to recalibrate the sensors 28. In one example, the controller 30 instigates a calibration operation after every twenty on/off ignition cycles.

At 44, the controller 30 prepares the system 20 for recalibration. Once the system is ready for recalibration, each sensor output is sampled at 46. Prior to proceeding with the calibration operation, the controller 30 preferably verifies that the conditions for calibration still exist at 48. If there is an indication of a load on the seat, for example, then the calibration operation is preferably cancelled and the controller 30 waits for the next time indicating that a calibration is due.

Assuming that the proper conditions for calibration still exist, the controller 30 preferably determines an average output for each sensor at 50. The standard deviation for each sensor output preferably is also determined at 52.

The next step at 54 is when the controller 30 preferably compares the average output value of each sensor to the current calibration value that is held in memory (not illustrated). If there is a difference between the determined average value and the currently stored calibration value, then the controller 30 preferably updates the calibration of the sensor using the newly determined average. If there is no difference between the determined average value and the currently stored value of a sensor, then there is no need to recalibrate that sensor and the newly determined data preferably is ignored. Lastly, at 56 the new calibration data preferably is stored in memory without overriding the previous calibration information. A system designed according to this invention preferably tracks calibration information over time and maintains old calibration information for later comparisons and other determinations.

There are a variety of ways to program the controller 30 to determine when a calibration condition exists. As discussed, counting the number of ignition on/off cycles is one possibility. In another example, the controller 30 automatically performs a recalibration operation after a selected time period has elapsed. Given this description, those skilled in the art will be able to develop an appropriate strategy and program a controller 30 accordingly to meet the needs of a particular situation.

Figure 3:
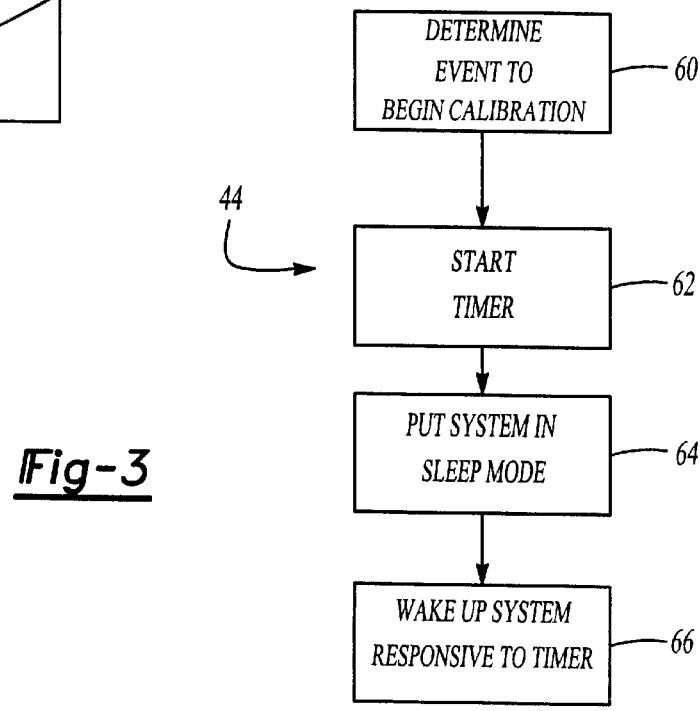
FIG. 3 is a flow chart diagram illustrating more details of a portion of the flow chart of FIG. 2.

As shown in FIG. 3, the controller 30 preferably prepares the system 20 for recalibration in a manner that maximizes energy conservation in the system. In the currently preferred embodiment, the step 44 of preparing the system for recalibration preferably includes several sub-steps. The controller 30 preferably verifies that the chosen event that triggers a recalibration operation has occurred at 60. The controller 30 preferably then starts a timer at 62 and puts the system into sleep mode at 64. After the time of the timer has elapsed, the controller 30 preferably wakes up the system at 66.

Once the system is awakened, the sensors 28 preferably are powered using a minimal amount of power for very short times. Depending on the nature of the actual sensors 28, the frequency of power provided to the sensors and the frequency of the corresponding outputs signals is variable. Those skilled in the art who have the benefit of this description will be able to choose appropriate parameters.

Figure 4:
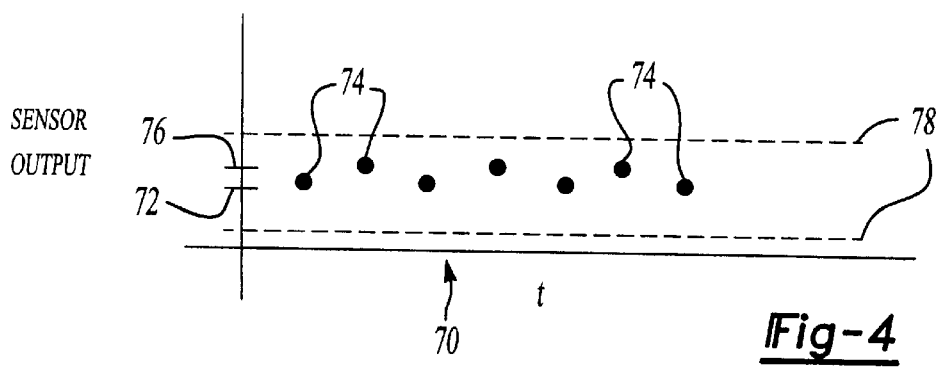
FIG. 4 is a graphical illustration of a portion of the method of this invention.

FIG. 4 includes a graphical illustration 70 of a sensor output over time. In this example, the sensor has a current calibration value at 72. During the calibration operation, a plurality of sensor outputs 74 are detected by the controller 30. An average value of the output 74 is shown at 76. Because there is a difference between the currently stored calibration value 72 and the determined average 76, the controller 30 next preferably determines whether the sensor should be recalibrated using the value 76. Provided that the value 76 is within the range 78, the controller 30 preferably substitutes the average value 76 for the previously stored calibration value 72. Sensor 28 is accordingly recalibrated with the new value 76. The value 72 preferably is maintained in memory for later comparison or other determinations.

The range 78 preferably is kept small enough to avoid any unwanted sensor outputs from being used within the calibration process. It is most preferred to calibrate the sensors when there is no load the seat 22. If a sensor output during a calibration operation is influenced by a load on the seat 22, then the calibration would not be accurate. Accordingly, the controller 30 is preferably programmed to recognize a sensor average value 76 that only comes within the range 78 as a possible recalibration value. Those skilled in the art who have benefit of this description will be able to choose an appropriate range 78 given the parameters of particular system with which they are working.

In the preferred embodiment, the standard deviation of the output value 74 is also determined. If the standard deviation value is outside of a selected range, then the controller 30 preferably is programmed to not utilize that data as part of a recalibration process. Again, spikes or outputs provided by the sensor, which are influenced by a load on the seat preferably are avoided during the calibration process.

This invention provides an accurate and reliable way of recalibrating sensors in a weight classification system. Because the materials used in a vehicle seat can change properties over time (i.e., stiffness or resilience in a seat cushion) some recalibration of the sensors over time is useful. Currently known weight classification systems include sensors that measure deflections in the seat material on the order of micrometers. Therefore, controlled accuracy in sensor calibration is highly desired.

The preceding description is exemplary rather than limiting in nature. Variations and modifications to the disclosed examples may become apparent to those skilled in the art that do not necessarily depart from the purview and spirit of this invention. The scope of legal protection given to this invention can only be determined by studying the following claims.

We claim:

1. A method of calibrating a weight classification system having at least one sensor that detects a load on a vehicle seat, comprising the steps of:
   (A) determining when a calibration condition exists;
   (B) sampling a plurality of outputs of the sensor over a selected period;
   (C) determining an average output of the sensor, using the sampled outputs of step (B);
   (D) determining if the average of step (C) is within a selected range; and
   (E) calibrating the sensor using the average of step (C) when the average is within the selected range of step (D).

2. The method of claim 1, wherein step (A) includes detecting a vehicle operation condition that indicates that the seat is unoccupied.

3. The method of claim 1, wherein step (A) includes determining when an ignition on the vehicle has been turned off and waiting a selected period of time before beginning step (B).

4. The method of claim 3, including counting a number of times that the ignition has been turned off since a previous calibration operation and performing steps (A) through (E) only after the number of times has exceeded a chosen number.

5. The method of claim 1, including putting the system into a sleep mode for a preselected period of time and then performing step (B) after the preselected period of time by providing a minimal amount of power to the sensor at a chosen frequency.

6. The method of claim 1, wherein the system includes a plurality of sensors and steps (B) through (E) are performed for each sensor, respectively.

7. The method of claim 1, wherein step (D) includes using a current calibration value and the range is within an expected variation from the current calibration value that encompasses sensor output values for the seat without a load on the seat.

8. The method of claim 1, including determining a standard deviation of the sensor outputs using the determined average and recalibrating the sensor using the average only when the standard deviation is within a selected range.

9. A weight classification system for a vehicle seat, comprising:
   a plurality of sensors that each generate an output indicative of a load on the seat; and
   a controller that communicates with the sensors, determines when a calibration condition exists, samples a plurality of outputs of each sensor over a selected period, determines an average of the sampled outputs of each sensor, determines if the average of each sensor is within a selected range, and calibrates any one of the sensors according to the determined average when the average for the corresponding sensor is within the selected range.

10. The system of claim 9, wherein the controller determines when a calibration condition exists by determining how many times an ignition of the vehicle has been turned off since a previous calibration operation.

11. The system of claim 9, wherein the controller puts the system into a sleep mode for a preselected period of time after determining that a calibration condition exists and then provides a minimal amount of power to each sensor at a chosen frequency after the period of time.

12. The system of claim 9, wherein the controller automatically cancels a calibration operation when the controller determines that a load has been on the seat during any portion of a calibration operation.

* * * * *